(12) United States Patent
Mo et al.

(10) Patent No.: US 10,710,121 B1
(45) Date of Patent: Jul. 14, 2020

(54) SYSTEMS AND METHODS FOR MODULAR CAMP SORTATION AND DYNAMIC LOADING LAYOUT GENERATION

(71) Applicant: COUPANG CORP., Seoul (KR)

(72) Inventors: Wenting Mo, Seoul (KR); Yoo Suk Kim, Seoul (KR); Sun Seung Lee, Seoul (KR); Sen Yang, Seoul (KR); Hongyuan Li, Seoul (KR); Changquan Piao, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/583,616

(22) Filed: Sep. 26, 2019

Related U.S. Application Data

(63) Continuation of application No. 16/277,231, filed on Feb. 15, 2019, now Pat. No. 10,464,106.

(51) Int. Cl.
*G06F 7/00* (2006.01)
*B07C 7/00* (2006.01)
*B65G 67/20* (2006.01)
*B65G 1/137* (2006.01)

(52) U.S. Cl.
CPC .......... *B07C 7/005* (2013.01); *B65G 1/1373* (2013.01); *B65G 67/20* (2013.01); *B65G 2201/0285* (2013.01)

(58) Field of Classification Search
None
See application file for complete search history.

(56) References Cited

U.S. PATENT DOCUMENTS

| | | | |
|---|---|---|---|
| 7,246,706 B1* | 7/2007 | Shakes | B07C 7/02 209/614 |
| 2011/0320376 A1* | 12/2011 | Dearlove | G06Q 10/08 705/337 |
| 2018/0290829 A1* | 10/2018 | Schroepf | G06Q 50/28 |

* cited by examiner

*Primary Examiner* — Yolanda R Cumbess
(74) *Attorney, Agent, or Firm* — Finnegan, Henderson, Farabow, Garrett & Dunner, LLP

(57) ABSTRACT

Computer-implemented systems and methods for optimizing sorting and loading of packages are disclosed. An exemplary system includes a memory storing instructions and may include at least one processor configured to execute the instructions. The system may perform operations including receiving data comprising a plurality of package identifiers associated with a plurality of packages. The operations may include determining a plurality of block areas associated with delivery locations for the plurality of packages. The operations may further include determining a delivery route by determining a first set of routes, determining optimal combinations of the inputs for each set of routes and determining a shortest route associated with the optimal combinations. The operations may include determining an order in which to load each of the packages into a delivery vehicle. The operations may further include generating instructions for causing a device to display a visual representation of the loading order.

20 Claims, 15 Drawing Sheets

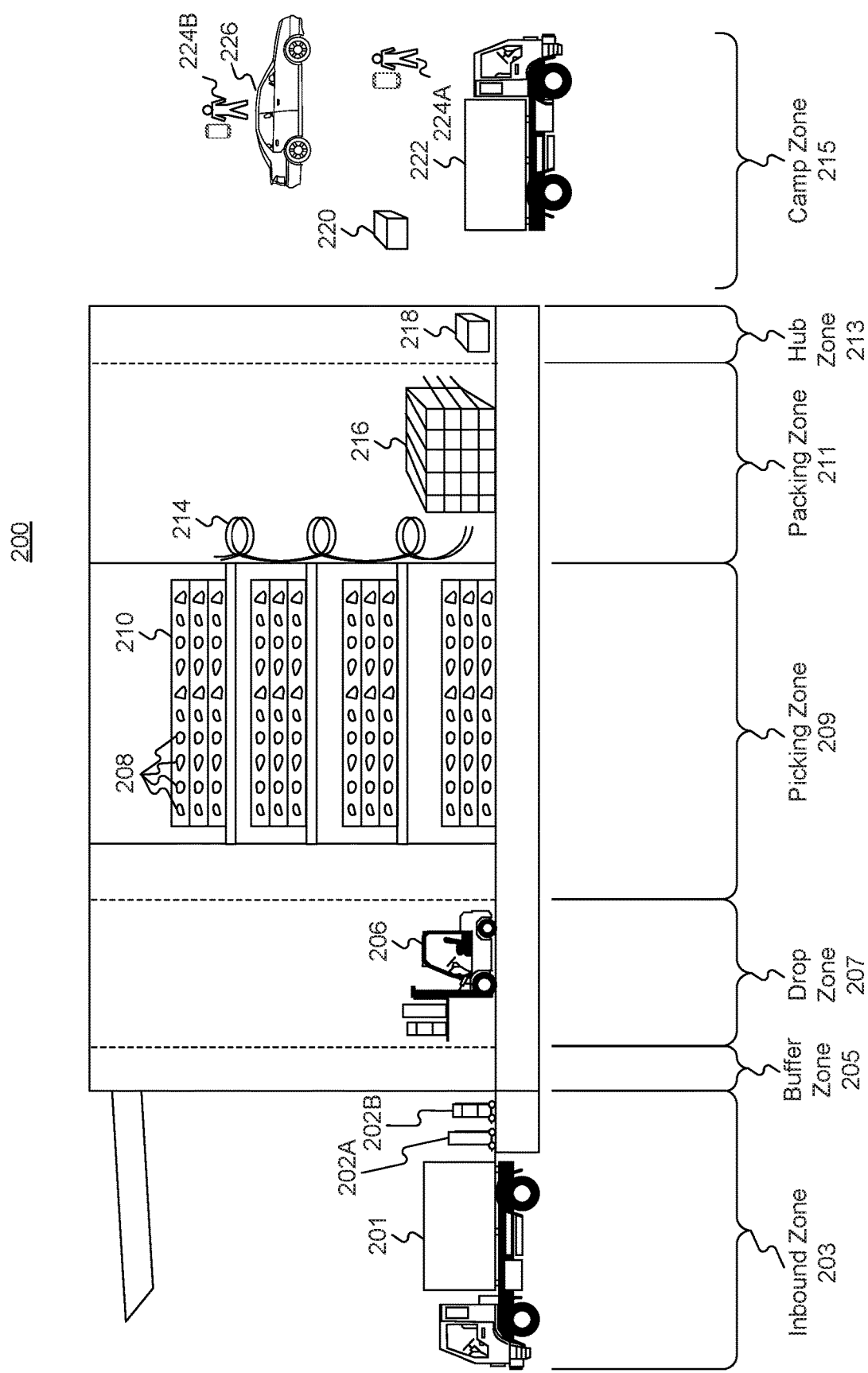

Loading Order Print-Out

| Delivery Vehicle 1 | | Delivery Vehicle 2 | |
|---|---|---|---|
| Position | Modular Container | Position | Modular Container |
| A | 2 | G | 1 |
| B | 3 | H | 9 |
| C | 7 | I | 6 |
| D | 4 | J | 5 |
| E | - | K | - |
| F | 8 | L | - |

Loading Directions For Vehicle 1:
1) Load Modular Container 2 Into Position A;
2) Load Modular Container 3 Into Position B;
3) Load Modular Container 4 Into Position D;
4) Load Modular Container 7 Into Position C;
5) Load Modular Container 8 Into Position F.

Loading Directions For Vehicle 2:
1) Load Modular Container 1 Into Position G;
2) Load Modular Container 9 Into Position H;
3) Load Modular Container 6 Into Position I;
4) Load Modular Container 5 Into Position J.

FIG. 8A

SYSTEMS AND METHODS FOR MODULAR CAMP SORTATION AND DYNAMIC LOADING LAYOUT GENERATION

RELATED APPLICATIONS

This application is a continuation of U.S. patent application Ser. No. 16/277,231 (now allowed) filed on Feb. 15, 2019, which is hereby incorporated by reference in the present application.

TECHNICAL FIELD

The present disclosure generally relates to computerized systems and methods for sorting and loading packages. In particular, embodiments of the present disclosure relate to inventive and unconventional systems for determining, based on data relating to one or more customer orders, a loading order of a plurality of packages, generating a visual representation of the loading order, and transmitting data relating to the loading order to one or more devices configured to display the visual representation.

BACKGROUND

Numerous computerized systems for package delivery exist. These systems include, for example, back-end systems that determine which delivery worker will deliver a package, generate routes for package delivery, communicate delivery routes and package information to delivery workers, and the like. These back-end systems are problematic in that they merely instruct workers to place certain packages in trucks, without any further guidance as to where to place the packages in the trucks. This leads to delays because a worker may need to pack and re-pack a truck in order to fit all packages. This can also lead to lost packages.

The systems can also include delivery worker devices such as mobile phones or Personal Digital Assistants (PDAs). When a delivery worker is delivering packages, these devices inform the delivery worker where to deliver a package and provide information (such as a barcode) to enable the delivery worker to find the package in the back of a delivery truck. However, these devices are rudimentary in that they provide information such as address, requiring the delivery worker to dig through dozens—if not hundreds—of packages to find the right package to deliver at each delivery location. This requires reliance on the delivery worker to know how to pack the delivery truck in advance and causes inefficiencies.

Therefore, there is a need for improved electronic methods and systems for sorting, packing, and delivering packages.

SUMMARY

Embodiments consistent with the present disclosure provide computerized methods and systems for optimizing the sorting and loading of packages. Embodiments may include methods and systems for providing visual representations of the optimized sorting or loading determination.

In some embodiments, a computer-implemented system may be configured to determine an optimal sorting and loading order of a delivery vehicle. The system may include a memory storing instructions. The system may further include at least one processor configured to execute the stored instructions to perform one or more operations consistent with this disclosure. The processor may receive data comprising a plurality of package identifiers associated with a plurality of packages. The processor may determine a plurality of block areas associated with delivery locations for the plurality of packages. The plurality of block areas may be determined based on the received data. The processor may be configured to determine a delivery route. The delivery route may comprise a sequence for delivering the plurality of packages. The processor may determine the delivery route by determining a first set of routes and transforming the first set of routes to determine optimal combinations of the inputs for each of the first set of routes. The processor may further determine a shortest route by swapping block areas associated with the transformed routes. The processor may be further configured to determine a loading order. The loading order may include an order in which to load each package of the plurality of packages into a delivery vehicle. The order may be based on the determined delivery route. The processor may be further configured to generate instructions for a device to display a visual representation of the loading order.

In some embodiments, a computer-implemented method may be configured to optimize the sorting and loading of a plurality of packages. The method may include receiving data comprising a plurality of package identifiers associated with the plurality of packages. The method may further include determining a plurality of block areas associated with delivery locations for the plurality of packages. The block areas may be determined based on the received data. The method may further include determining a delivery route comprising a sequence for delivering the plurality of packages. The delivery route may be determined by determining a first set of routes and transforming the first set of routes to determine an optimal combination of the inputs for each of the first set of routes. The transformed routes may be used to determine a shortest route for delivering the plurality of packages by swapping the order of block areas associated with each transformed route. The method may further include determining a loading order in which to load each of the plurality of packages into a delivery vehicle based on the delivery route. The method may further include generating instructions for a device to display a visual representation of the determined loading order.

In some embodiments, a system may be configured to optimize the sorting and loading of packages. The system may include a computer-implemented system comprised of a memory and a processor, the memory storing instructions that cause the processor to execute operations. The operations may include receiving data comprising a plurality of package identifiers associated with a plurality of packages. The operations may also include determining a plurality of block areas associated with delivery locations for the plurality of packages. The plurality of block areas may be determined based on the received data. The operations may further include determining a delivery route comprising area sequence for delivering the plurality of packages. The delivery route may be determined by determining a first set of routes, transforming the first set of routes to determine optimal combinations of the inputs for each of the first set of routes, and determine a shortest route by swapping the order of block areas associated with each transformed route. The operations may further include determining a loading order in which to load each package of the plurality of packages into a delivery vehicle. The loading order may be determined based on the determined delivery route. The operations may further include generating instructions for displaying a visual representation of the loading order. The operations may also include transmitting the instructions.

The system may include a sorting device configured to perform operations including receiving the transmitted instructions and sorting the plurality of packages according to the determined loading order. The system may also include a loading device configured to perform operations including receiving transmitted instructions and displaying the visual representation of the loading order.

Consistent with the disclosed embodiments, non-transitory computer-readable storage media may store program instructions, which are executed by at least one processor to perform any of the methods, processes, or operations described herein.

The foregoing general discretion and the following detailed description are exemplary an explanatory only and are not restrictive of the claims.

BRIEF DESCRIPTION OF THE DRAWINGS

FIG. 2 is a diagrammatic illustration of an exemplary fulfillment center configured to utilize disclosed computerized systems, consistent with the disclosed embodiments.

FIG. 8A depicts an exemplary display of a visual representation of a determined loading order, the display consisting of a print out, consistent with the disclosed embodiments.

DETAILED DESCRIPTION

Figure 1A:
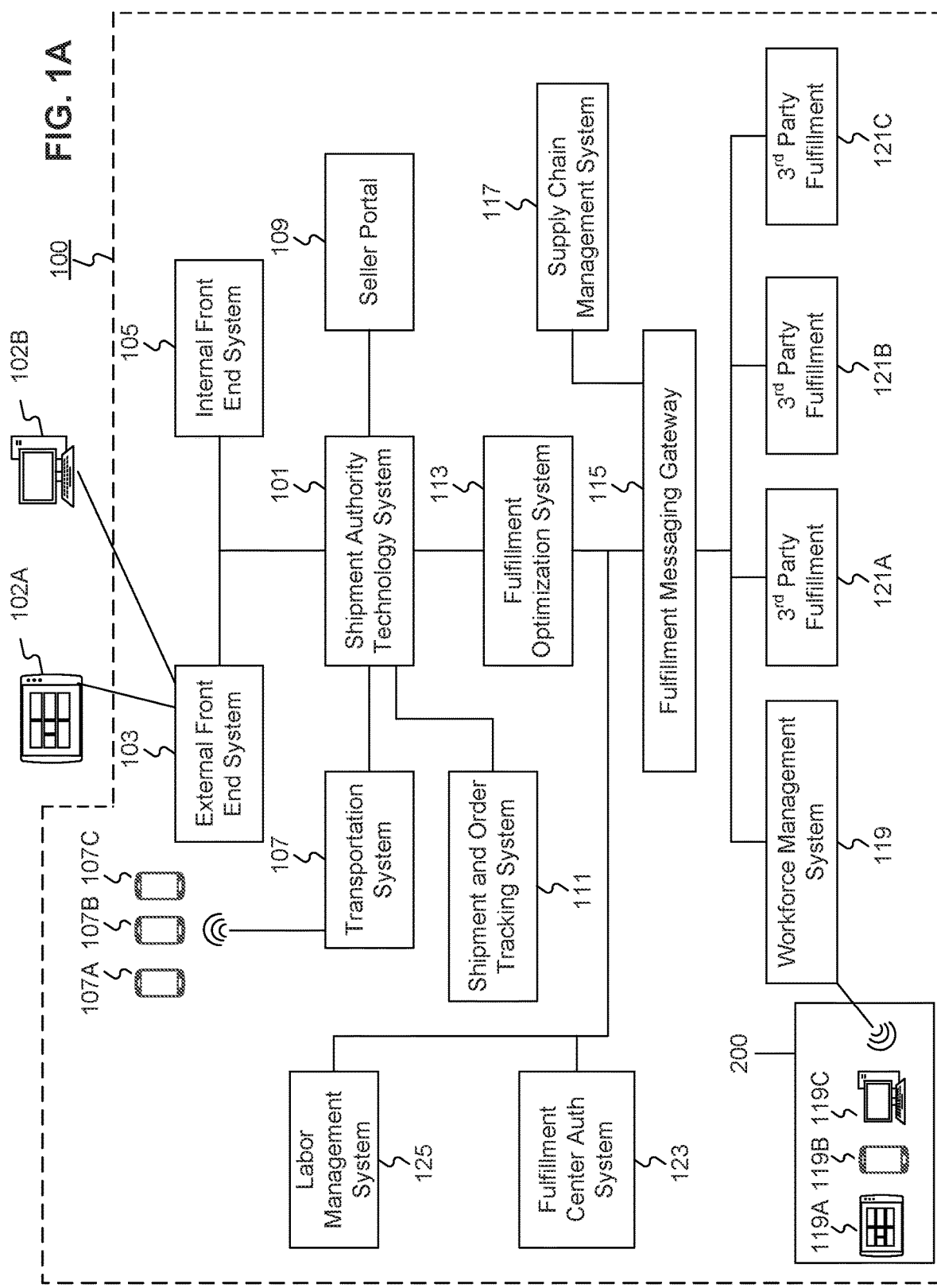
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for optimizing the sorting and loading of packages to be delivered. The sorting and loading may be based on determined block areas to which the packages are to be delivered. The sorting and loading order may be represented in a visual representation transmitted from a system to a display device.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of keeping the PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forwards it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 2015 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
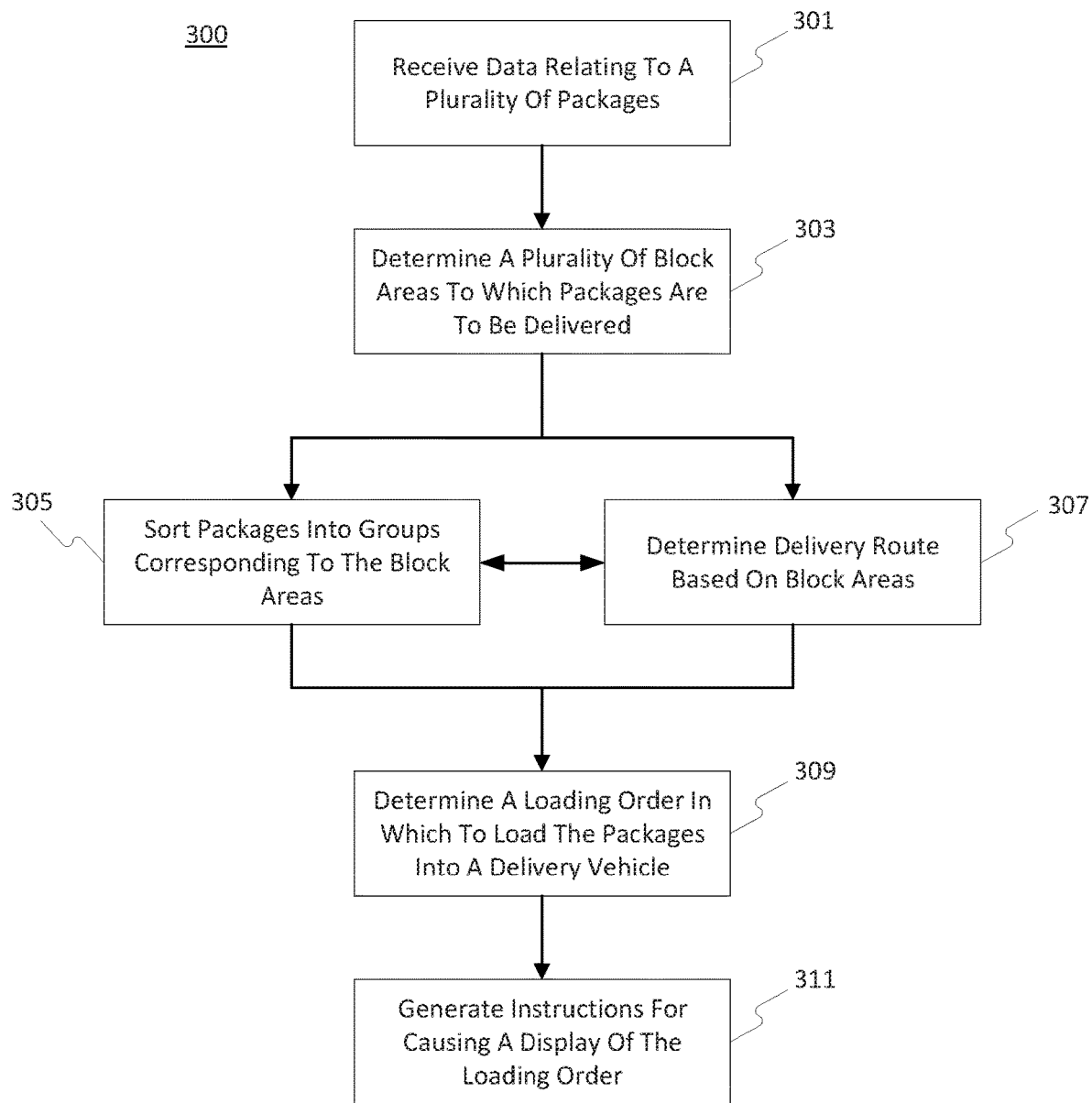
FIG. 3 is flowchart illustrating an exemplary method for optimizing the sorting and loading of packages, consistent with the disclosed embodiments.

According to the present disclosure, in some embodiments, transportation system 107 may be configured to optimize the sorting and loading of packages into a delivery vehicle. The system may optimize sorting and loading of packages by, for example, determining a plurality of block areas to which packages are to be delivered, determining an order in which to service each block area, determining an order in which to load a delivery vehicle such that the packages may be easily located when each block area is being serviced, and generating a visual representation of the loading order on a device so that a loader or an autonomous robot may load the packages into the delivery vehicle in according to the loading order. By way of example, FIG. 3 provides an exemplary method 300 for optimizing the sorting and loading of packages. The method or a portion thereof may be performed by the system. The system may contain one or more processors and a memory storing instructions that, when executed by the one or more processors, cause the system to perform operations for optimizing sorting and loading of packages. The system may be any included in system 100, a combination of systems included in system 100, a system not included in system 100, or a combination thereof. In other embodiments, one or more of the systems or devices depicted in FIG. 1A may perform one or more steps of method 300.

Consistent with this disclosure, the system may be configured to receive data relating to packages to be delivered. For example, method 300 may include step 301 for receiving data relating to a plurality of packages to be delivered. The data may include information relating to a package identifier, a customer order, a delivery address, a desired delivery date, a description of a product, a dimension of a package, or the like. The data may include data generated by, for example, FO system 113, for example, data associated with fulfilling orders placed by a customer. The data may additionally or alternatively include data generated by, for example, SAT system 101, for example, data associated with monitoring the order and delivery status of customer orders. For example, transportation system 107 may receive data relating to one or more packages that are prepared for delivery and the data may include a delivery address for each of the packages.

The data may be received from any system or device disclosed herein. For example, the data may be received from a mobile device, such as device 119A or device 119B. Additionally or alternatively, the data may be received from a system that stores or generates data relating to package delivery, such as from SAT system 101, FO system 113, shipment and order tracking system 111, WMS 119, and so forth.

The data may be received by the system during any stage of processing the package. For example, the data may be received in response to a picker scanning a barcode with mobile device 119B as the package is transported from the drop zone 207 to the picking zone 209. In another example, the data may be received as items are packaged for shipping, for example at the packing zone 211, or when the items are transported to the hub zone 213 or camp zone 215 for shipment.

Consistent with this disclosure, the system may be configured to determine a plurality of block areas. For example, method 300 may include a step 303 for determining a plurality of block areas to which packages are to be delivered. A block area may be a geographical area to which at least one of the plurality of packages is to be delivered. Each block area may be an unbreakable or continuous geographical area in which at least one of the plurality of packages may be delivered consecutively. A geographical area may be unbreakable or continuous if it has qualities that make it easy to deliver one or more packages within the area with minimal use of a delivery vehicle. For example, a geographical area may be a block area if it is possible for a delivery person to park a delivery vehicle in one location and deliver multiple packages in the geographical area without having to move the delivery vehicle. As another example, a geographical area may be a block area if it is possible for a delivery person to park a delivery vehicle in a first location within the area, deliver one or more packages within a first portion of the area, and then move the delivery vehicle to a second location within the area without, for example, having to travel on or across a highway or other major transportation system, and deliver one or more packages within a second portion of the area. A block area may be an area within a geographical area to which a particular quantity or size of packages is to be delivered. For example, the system may group the plurality of packages into groups of roughly equal size and use geographical information to determine block areas corresponding to each of the groups of packages. Examples of block areas and the process for determining their location, dimension, and so forth are discussed below with respect to FIG. 4.

Consistent with the present disclosure, the system for optimizing the sorting and loading of packages may be configured to sort packages into groups of packages. The packages may be sorted into groups that correspond with the plurality of block areas. For example, method 300 may include step 305 for sorting packages into groups corresponding to the block areas determined at step 303. The sorting may include correlating each package in a plurality of packages with one of the determined block areas and positioning each package with other packages corresponding to the same block area. Transportation system 107, may use data relating to the block areas, such as the location of a block area or the addresses included in the block area, and compare that data with the data from each package to determine to which block area each package is to be delivered.

Transportation system 107 may automatically sort packages into a plurality of groups or may provide instructions to a worker or machine, the instructions including the proper sorting of the packages. For example, a conveyor belt may be used to sort packages into a plurality of groups by, for example, using a divider on the conveyor belt to separate packages at various points on the conveyor belt. For example, the packages associated with block area 401 may be removed from the conveyor belt by a separator at a first point on the conveyor belt and the packages associated with block area 409 may be removed from the conveyor belt by a separator at a second point on the conveyor belt and so forth. In another example, the system may determine how the packages are to be sorted into the plurality of groups and provide instructions to a worker, such as by providing instructions on a GUI on mobile device 107A or device 119A, and the worker may manually sort the packages according to the instructions.

The packages may be sorted into the groups at hub zone 213, camp zone 215, or a combination thereof. For example, as a worker or machine retrieves package 218 in hub zone 213, the package may be scanned and associated with a block area. The package may then be grouped based on its association with the block area. In another example, package 220 may be sorted into a group corresponding with a block area as it is handled in camp zone 215. Additionally or alternatively, it is contemplated that packages may be sorted into groups, each group corresponding to a plurality of block areas, at hub zone 213 and further sorted into a sub-groups, each sub-group corresponding with a block area. In this example, the packages to be delivered to geographical area 400, representing in FIG. 4, may be grouped together in hub zone 213 and transported to camp zone 215. Once in camp zone 215, the packages may be further divided into seven sub-groups, each sub-group corresponding to one of the seven block areas 401, 403, 405, 407, 409, 411, or 413.

Consistent with this disclosure, sorting the packages may include sorting each group of packages into one or more modular containers. The modular containers may be any container that is capable of temporarily storing one or more packages. The modular containers may be re-usable and may be configured such that they are easily loadable into a delivery vehicle. For example, a modular container may have wheels, enabling it to be easily transported around FC 200, or may be configured such that it is movable by a machine, such as forklift 206. A modular container may have one or more compartments for storing packages and may be configured such that compartments may be added or removed, for example by inclusion of a selectively removable wall or divider. Packages relating to a block area may be stored in one or more modular containers between the sorting and delivery of the package. It is also contemplated that packages associated with more than one block area may be stored on a single modular container. Examples of modular containers are discussed below with respect to FIG. 5A and FIG. 5B.

Data relating to the sorted packages may be transmitted to other systems within system 100 or may be transmitted to external systems. For example, transportation system 107 may sort the packages as described above and provide information to FO system 113, shipment and order tracking system 111, or other systems that may process the data. The data may include information relating to which packages are sorted into each group, how many packages are sorted into each group, the dimension of the packages sorted into each group, the package identifiers associated with the packages of each group, the location of each group, the modular container associated with each group, and so forth.

Consistent with this disclosure, the system for optimizing sorting and loading of packages may be configured to determine a delivery route. The delivery route may be determined based on data relating to the determined block areas. For example, method 300 may include a step 307 for determining a delivery route based on the block areas determined in step 303. Additionally or alternatively, transportation system 107 may determine the delivery route based on data relating to the sorted packages, based on historical delivery data or operational data, or a combination thereof.

A delivery route may comprise a sequence for delivering the plurality of packages. For example, a delivery route may include an order in which to service each of the plurality of block areas. For example, a delivery route may be a route that first delivers packages to block area 413, then to block area 411, then to block area 407, and so forth. A delivery route may additionally or alternative include a physical route through a geographical area and include, for example, directions for navigating a delivery vehicle through the delivery route and instructions for how and/or where to deliver packages along the route. Examples relating to the determination of delivery routes are discussed below with respect to FIG. 6A and FIG. 6B.

Consistent with this disclosure, the system for optimizing the sorting and loading of packages may be configured to determine an order in which to load a delivery vehicle. The loading order may comprise an order in which to load each of a plurality of groups of packages. For example, method 300 may include step 309 for determining a loading order in which to load the groups of packages determined at step 305 into a delivery vehicle. The loading order may include a position at which each package or group of packages is to be placed within the delivery vehicle. The loading order may be tailored to a delivery vehicle. The loading order for the same route may differ, for example, if a delivery vehicle having a cargo area configured in a first configuration is used for the delivery or if a delivery vehicle having a cargo area with a second configuration is used for the delivery. For example, if the cargo area has multiple physical compartments, a loading order may include an order in which to load a first compartment and an order in which to load a second compartment. Similarly, a loading order may be dictated by the position of the door or access point of delivery vehicle. Examples of configurations of delivery vehicles and the loading order that may be associated with each is discussed below with respect to FIG. 7A and FIG. 7B.

As discussed above, the plurality of packages to be delivered to a geographical area may be sorted into modular containers associated with block areas within the geographical area. Sorting packages into modular containers may simplify the process for determining a loading order. For example, the loading order may comprise an order in which to load each of a plurality of modular containers into a delivery vehicle.

Consistent with this disclosure, the system for optimizing the sorting and loading of packages may generate instructions for causing a device to display a visual representation of the loading order. For example, method 300 may include a step 311 for generating instructions for causing a display of the loading order determined in step 309. The instructions may include directions for several types of displays. For example, the instructions may include directions for causing a computer system to print the visual representation of the loading order, directions for causing a mobile device to display the visual representation in a GUI, direction for causing a computing system to transmit the visual representation to a plurality of devices, a combination thereof, and so forth. Examples of visual representations and the instructions for displaying the same are discussed below with respect to FIG. 8A and FIG. 8B.

Figure 4:
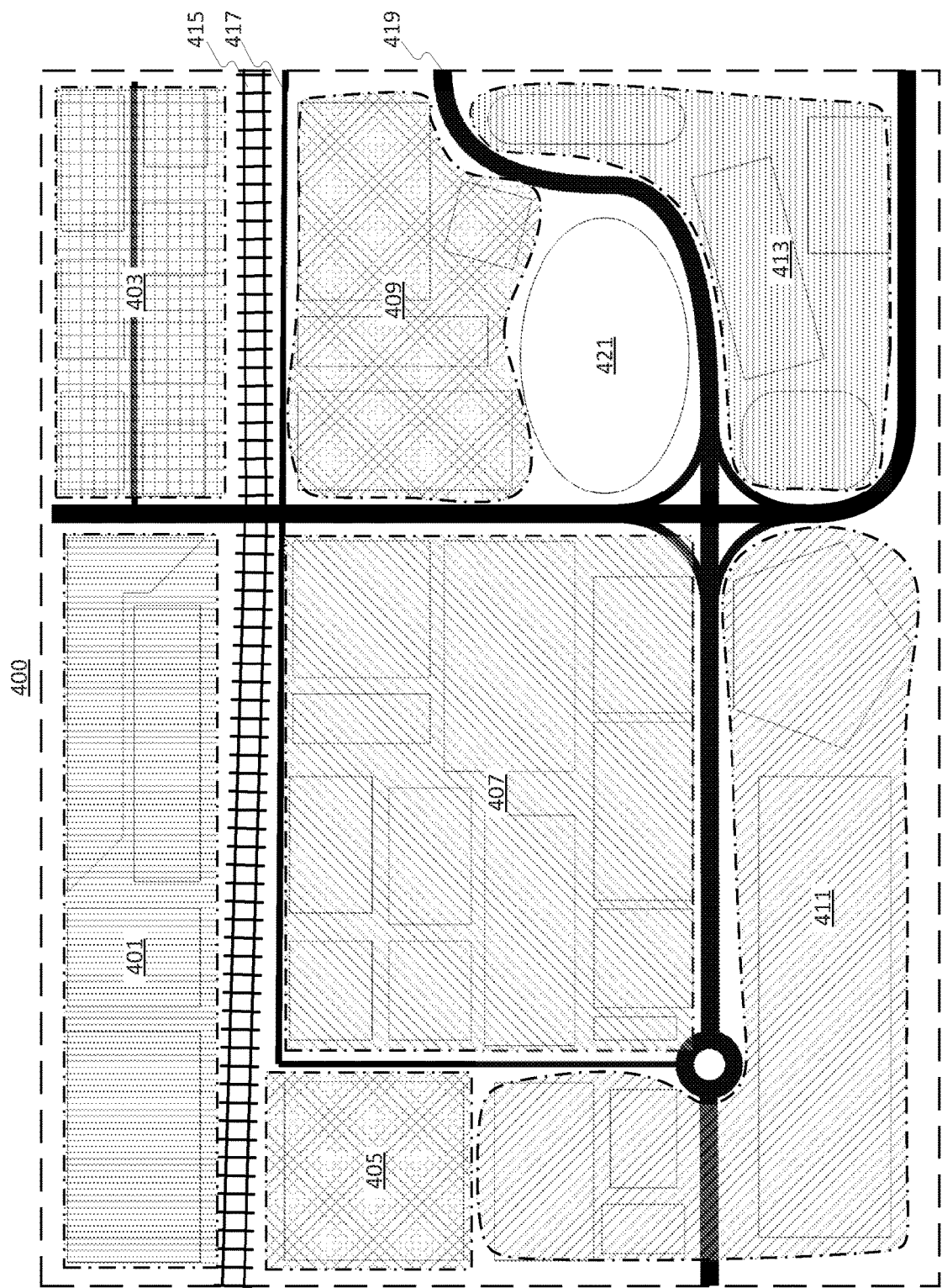
FIG. 4 depicts an exemplary geographic area with a plurality of determined block areas mapped onto the geographic area, consistent with the disclosed embodiments.

FIG. 4 illustrates a plurality of block areas 401, 403, 405, 407, 409, 411, 413 mapped onto geographical area 400. Geographical area 400 includes multiple city blocks defined by highway system 419, road system 417, and railroad system 415 and contains a plurality of buildings (not numbered) and pond 421. Each block area is associated with a delivery location for one or more of the plurality of packages.

As may be appreciated from this disclosure, a block area may be of any dimension. For example, if multiple packages are to be delivered to a single building, such as an apartment building or an office building, a block area may include only that building. Block area 405 is an example of a block area that includes a single building. In another example, a block area may be the size of multiple city blocks and may include multiple buildings, residences, or a combination thereof. Block area 403 is an example of a block area that covers two blocks of geographical area 400 and includes multiple buildings. It is also contemplated that a block area may include only a portion of a building. For example, an office building with multiple tenants may be divided into multiple block areas depending upon the quantity of packages to be delivered to each tenant. As may be appreciated from this disclosure, a block area may be of any shape or configuration. Block area 407 is an example of a block area that is substantially rectangular and block area 411 is an example of a block area that is irregular in shape.

The boundaries of a block area may be defined by existing physical boundaries, by artificial boundaries, or a combination thereof. Physical boundaries may include, for example, a body of water, a highway or road system, a railroad, a building, a tree line, and so forth. Artificial boundaries may include boundaries associated with area codes, postal codes, service areas, neighborhoods, other block areas, and so forth. Block area 409 is an example of a block area that is defined by physical boundaries including pond 421 on one side, highway system 419 on two sides, and road system 417 on another side. Block area 411 is an example of a block area that is defined by highway system 419, a physical boundary, on one side, and defined by the outer boundary of geographical area 400 on two sides and by adjacent block area 405 on another side, both of which are artificial boundaries.

A block area may be determined from data relating to a plurality of packages to be delivered. As discussed above, the data received by a system, for example at step 301 of method 300, may include a delivery address for a package. A system, such as transportation system 107, may use the delivery address to determine a geographical area corresponding to the address and further determine a block area associated with the address. A block area may be determined from pre-existing geographical areas or other artificial boundaries. For example, the system may receive data relating to delivery addresses of a plurality of packages and associate the addresses with one or more postal codes. The system may then determine that a first group of packages are to be delivered to a first sub-area of the postal code and a second group of packages are to be delivered to a second sub-area of the postal code, and so forth. The area defined by the postal code may then be divided into a plurality of block areas, each block area corresponding with one or more of the identified sub-areas within the postal code.

Block areas may be defined by historical delivery data. For example, based on prior deliveries, transportation system 107, for example, may determine that a sub-area of a geographical area consistently receives a high quantity of packages. This area may, for example, be saved in a memory device or database in communication with system 100 as a known block area. In future analyses, when the geographical area to be services includes the known block area, transportation system 107 may automatically classify the portion of the geographical area corresponding with the known block area as a first block area, thereby simplifying the breakdown of the geographical area into a plurality of block areas. For example, if block area 413 is associated with a business park that consistently receives a high quantity of packages, the next time a system is determining a plurality of block areas for geographic area 400, it may begin the analysis by automatically classifying block area 413 as an independent block area. The historical data may also include data relating to the natural boundaries of an area or the ease of service to an area. For example, for block area 411, it may seem that highway system 419, which bisects block area 411, should serve as a natural boundary and that block area 411 should be divided into two block areas. However, the historical data may indicate that delivery drivers are able to service both sides of highway system 419 within block area 411 with ease. This may be determined based on driver feedback, a monitored efficiency of delivery within that area, or other metrics provided to or determined by the system.

Block areas may be automatically determined by a system. For example, transportation system 107 may receive the data described above and determine a plurality of block areas as described above using, for example, a neural network or other computer-learning methodology. An advantage of determining the block areas automatically is that the computing system may generate additional data that may be automatically analyzed in subsequent operations or transmitted to other systems. In other examples, block areas may be determined based on inputs from one or more workers. For example, workers may have practical knowledge from prior experience that justifies creating two adjacent block areas. In another example, the computing system may determine a plurality of block areas and display the block areas to one or more workers, the one or more workers may then have an opportunity to adjust or confirm the boundaries of the determined block areas by interacting with the system.

Data relating to the determined block areas may be transmitted to other systems, stored in a memory device or database, or otherwise processed by system 100. The data may include information relating to the block area, such as the location, size, or dimension of the block area and so forth. The data may also include information relating to the packages to be delivered to each block area, such as the quantity of packages, the dimension of packages, the package identifiers for each package, and so forth.

Figure 5A:
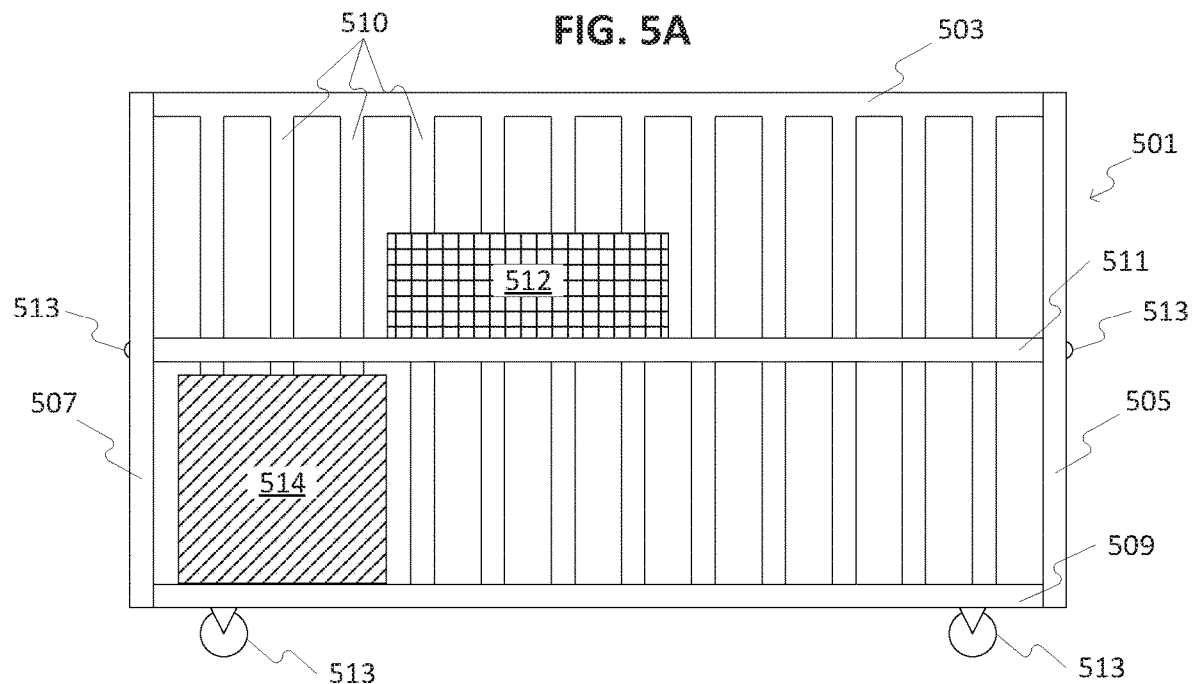
FIGS. 5A and 5B are diagrammatic illustrations of an exemplary modular container configured to receive a plurality of packages, consistent with the disclosed embodiments.
Figure 5B:
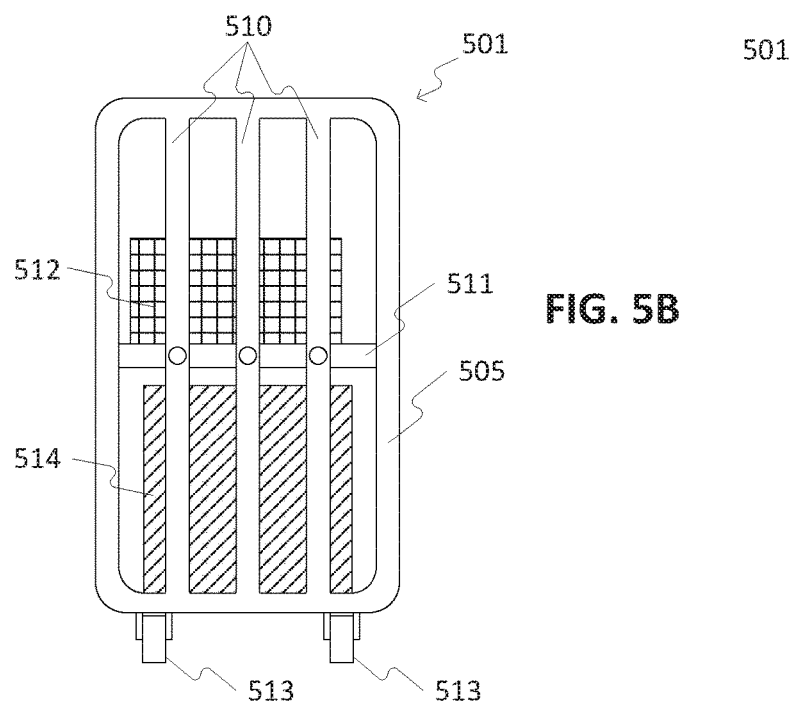

FIG. 5A provides a front view of an exemplary embodiment of modular container 501 and FIG. 5B provides a side view of the same exemplary modular container 501. Modular container 501 comprises a back side 503, a right side 505, and a left side 507. While modular container 501 lacks a front side, it is contemplated that it may be configured to have a removable front side, which may include a hinged door, a slidable wall, or other portion that is selectively movable to allow for the loading and unloading of packages into or onto modular container 501. Each of the back side 503, right side 505, and left side 507 are illustrated as being comprised of a plurality of vertical bars 510, it should be understood, however, that this construction is exemplary only and each side 503, 505, 507 may be of any configuration.

Modular container 501 includes a bottom 509, which also serves as a bottom shelf for receiving a plurality of packages. For example, package 514 is resting on the top surface of bottom 509. Bottom 509 may serve as an attachment point for means for making modular container 501 mobile. For example, wheels 513 may be attached to bottom 509 by any means known in the art. It is also contemplated that wheels 513 may be attached to any of sides 503, 505, 507, or attached to a combination of bottom 509 and sides 503, 505, 507. Modular container 501 also includes divider 511, which is a removable shelf located between the bottom shelf and the upper edge of modular container 501. Divider 511 acts as a shelf for supporting a group of packages. For example, package 512 is resting on the upper surface of divider 511. Divider 511 may be attached to modular container 501 by any means known in the art. For example, divider 511 may be attached by mechanical fasteners 513 through the vertical bars 510 of the right side 505 and the left side 507. Divider 511 may be removed such that modular container 501 has one compartment defined by the bottom 509 and each of the sides 503, 505, and 507.

It is contemplated that modular container 501 may be configured such that it may be stored in a space-saving configuration when not in use. A plurality of modular containers may be loaded into a delivery vehicle and may remain in the delivery vehicle after packages are delivered to a delivery destination. Configuring the modular containers to transform into a space-saving configuration may allow for a worker to store an empty modular container in a delivery vehicle after removing the packages previously loaded in the modular container, thereby freeing up space in the delivery vehicle. For example, modular container 501 may have a collapsible design such that it may collapse into a substantially flat configuration. As another example, modular container 501 may be disassembled, for example by removing mechanical fasteners, and stored in a configuration that requires less volume than an assembled modular container.

Packages corresponding to each block area may be sorted onto modular containers 501. The packages from a single block area may be loaded into one modular container 501. For example, there may be a plurality of packages that are to be delivered to block area 411 and a first modular container 501 may be loaded with all of the packages intended for block area 411. The quantity of packages may be sufficient to fill an entire modular container 501 with the divider 511 removed. In another example, there may be a group of packages intended for block area 409 and a group of packages intended for block area 407. The packages intended for block area 409 may be placed in a first compartment of modular container 501, the first compartment being defined by the area between bottom 509 and divider 511, and the packages intended for block area 407 may be placed in a second compartment of the same modular container 501, the second compartment being defined by the area above divider 511.

The modular containers provide several advantages for sorting and loading packages. As an example, packages sorted by block area into a modular container at a first location, for example at hub zone 213, need not be re-sorted when loaded onto a delivery vehicle at camp zone 215. The modular containers may also be intelligently sized to fit in a delivery vehicle with minimal wasted space. For example, modular container 501 may be of a height that corresponds with the height of a cargo area of a delivery vehicle. Further, modular container 501 may have a width that is a proportion of the dimension of a delivery vehicle. For example, the width of modular container may be one-third the width of a cargo area of a delivery vehicle, such that a delivery vehicle may be loaded with three modular containers with minimal wasted space in the cargo area of the delivery vehicle. The efficiency generated by the sorting and loading into modular containers may lead to improvements in delivery time, fuel efficiency, and other delivery advantages.

It is understood that packages may be sorted by any means consistent with this disclosure and need not be sorted into modular containers. For example, transportation system 107 may determine how the packages are to be sorted in substantially the same manner as described above, and may generate instructions for sorting the packages into a plurality of groups. The instructions may include, for example, the package identifier for each package, a group identifier for each group of packages, and instructions for placing each package into a corresponding group. The sorting may be executed by, for example, a sorting device, a robotic system, or the like. Some embodiments may include manual sorting as well.

A system may determine one or more delivery routes based on a plurality of factors. Efficiency preferences may be used to determine a delivery route. Efficiency preferences may be any rules or guidelines that are provided by a user or determined by a system and which relate to the efficiency of delivering packages. For example, a first efficiency preference may provide that right turns are preferred over left turns because right turns can be made at red lights and are otherwise easier to perform. Another example of an efficiency preference may be that a delivery vehicle may only go out for delivery if it is over a certain percentage full, for example, any delivery vehicle leaving FC 200 may need to be at least eighty percent full of packages. Another example of an efficiency preference may be that no two routes may overlap with one another. Another example of an efficiency preference may be a preference for delivering packages to the block area with the most packages before other areas. The efficiency preferences provided here are exemplary only and it is understood that any efficiency preference may be included in the route determination.

Resource data may also be used to determine a delivery route. Resource data is any data relating to the resources that may be used on a delivery. Examples of resource data include data relating to the number and type of delivery vehicles available (e.g., two trucks and one passenger van), the number of delivery workers available (e.g., one full-time worker and two part-time workers), the number of assistive machines or systems available for the delivery (e.g., one dolly or autonomous robot), and so forth. Resource data may be provided to a system through an input, such as on device 119A, or may be determined by a system, such as WMS 119.

Package data may also be used to determine a delivery route. Package data may include the package identifiers, the quantity of packages, the dimensions of packages, the areas to which the packages are to be delivered, how the packages are sorted, and so forth. The package data may be received by a system from an input or from another system. For example, the package data may include the data received at step 301 of method 300, the data generated at step 303 of method 300, the data generated at step 305 of method 300, or a combination thereof.

The factors used to determine a delivery route may depend upon whether the delivery route is determined before or after sorting packages into groups corresponding with block areas, as described above. For example, a system may receive data relating to geographical area 400 and determine a route for delivering packages to each of the block areas based on efficiency preferences and the terrain of geographic area 400. The resulting route may be, for example, the most efficient route for accessing each block area. For example, the most efficient route, according to efficiency preferences, may be one that starts with block area 409, then block area 413, then block area 411, then block area 407, then block area 405, then block area 401, and finally block area 403. Conversely, if the packages have already been sorted into groups, the package data may indicate that some of the block areas contain significantly more or fewer packages than other areas or that the packages of some block areas have been sorted on the same modular container. For example, if block area 407 has the highest quantity of packages among the block areas in geographical area 400 and the packages for block areas 411 and 405 have been sorted onto the same modular container, the system may determine that it is most efficient to first deliver all of the packages for block area 407, and then determine an order in which to deliver the packages to the other block areas with the condition that block areas 411 and 405 should be delivered consecutively since the packages therefor are contained in the same modular container.

Figure 6A:
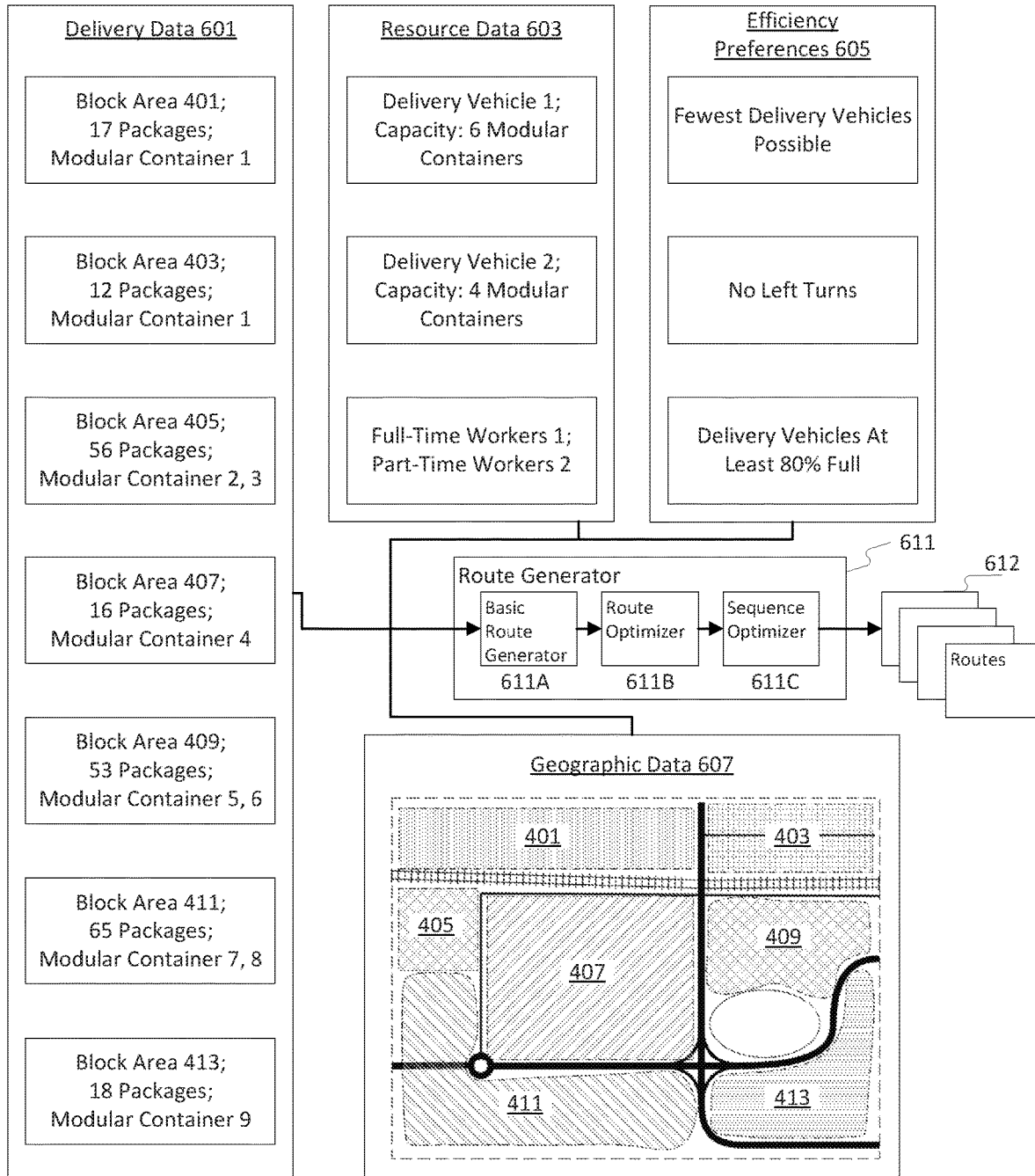
FIG. 6A is a flowchart illustrating input data for generating a delivery route consistent with the disclosed embodiments.

FIG. 6A is an illustration of an exemplary flowchart depicting the input into a route generator. As may be appreciated from FIG. 6A, the input may include several different types of data and each type of data may contain a plurality of information. For example, delivery data 601 may include data relating to the identity of each block area, the quantity or volume of packages to be delivered to each block area, and an identity of a modular container in which the packages are sorted. For example, the input represented by FIG. 6A may be performed as part of step 307 of method 300 and the delivery data 601 may include data relating to the block areas, which was generated at step 303 of method 300, and data relating to the sorting of the packages into modular containers, which may have occurred during step 305 of method 300. The delivery data 601 is exemplary only and may include data not shown in FIG. 6A or may exclude a portion of the data shown in FIG. 6A.

The input may include resource data 603, which relates to the resources available to accomplish delivery of the packages. In the example of FIG. 6A, resource data 603 includes data relating to the availability of delivery vehicles, the capacity of each delivery vehicle (e.g., measured in a number of modular containers that may be received in the delivery vehicle), and the availability and status of workers who may deliver the packages. Resource data 603 may include other information, such as the number of delivery vehicles available, the preferences or limitations of each delivery vehicle (e.g., a two-wheel drive vehicle may not be able to service areas in mountains or other treacherous terrain, etc.), the fuel efficiency of each delivery vehicle, and so forth.

The input may include efficiency preferences 605, which relate to pre-set or determined standards. The efficiency preferences 605 may be any efficiency standards an entity affecting the delivery wishes to achieve or any standards a system or worker deems important. For example, a first efficiency standard may be using the fewest delivery vehicles possible to deliver the packages to each block area, a second efficiency standard may be a desire to perform no left turns while out on delivery, and a third efficiency standard may be to have every delivery vehicle over 80% full before leaving for delivery.

The input may also include geographic data 607. Geographic data 607 is depicted as a map corresponding to that of FIG. 4, but the data may take any form, including a visual representation (such as a map), a description of an area (such as GPS coordinates or topographical information), or a combination thereof. Geographic data 607 may include the location, position, dimension and so forth of each block area 401, 403, 405, 407, 409, 411, 413 within the geographic area. In addition to the listed data, addition data, such as historic delivery data, may be included as an input. Delivery data 601, resource data 603, efficiency preferences 605, geographic data 607, and any other input data is provided to route generator 611 for processing.

Route generator 611 may include one or more algorithms for processing the input data to determine delivery routes 612 comprising sequences for delivering the plurality of packages. Route generator 611 may be implemented as hardware, software, firmware, or a combination thereof. Route generator 611 may include a matching algorithm configured to determine which resources are needed to complete the delivery, group the resources, and match them to, for example, the packages to be delivered. For example, matching algorithm may compare delivery data 601 with resource data 603 to determine that both of the delivery vehicles identified in resource data 603 will be required to transport the nine modular containers identified in the delivery data 601. This determination may be based on a determination that the capacity of neither delivery vehicle (six modular containers for the first delivery vehicle and four modular containers for the second delivery vehicle) is sufficient to accommodate the nine modular containers identified in delivery data 601 but that the total capacity of the two delivery vehicles is sufficient to accommodate the nine modular containers. Matching algorithm may also determine, for example, which worker should be matched with each of the delivery vehicles, which areas of FC 200 (e.g., a camp zone 215, a shipping zone 217, etc.) should be matched with each delivery vehicle, and other logistic information. Matching algorithm may also be configured to recognize specific requirements in delivery data 601 and match those packages having the specific requirements with an appropriate resource identified in resource data 603. For example, if a first group of packages requires refrigeration, matching algorithm will match those packages with a delivery vehicle having refrigeration capabilities.

Route generator 611 may include a balancing algorithm for balancing the load between a first delivery vehicle and a second delivery vehicle. The load may be balanced based on any criteria. For example, a system may balance a load such that each delivery vehicle is roughly the same proportion full when leaving FC 200, such that each delivery vehicle travels substantially the same distance while on a delivery route, or any other balancing criteria. In the example depicted in FIG. 6A, the balancing algorithm may determine that the larger delivery vehicle (with a capacity of 6 modular containers) should have more modular containers than the smaller delivery vehicle and may determine which modular container to assign to each delivery vehicle. The balancing algorithm may consider geographic data 607 and efficiency preferences 605 in the analysis, for example, by determining which modular containers have a delivery destination in close proximity to one another or determining a total distance required to deliver all modular containers and dividing the total distance between the two delivery vehicles substantially equally or in proportion to each delivery vehicle's size, fuel efficiency, or other criteria.

It is contemplated that the matching algorithm and the balancing algorithm may determine a plurality of potential routes. For example, matching algorithm may determine multiple possible combinations of delivery vehicles, workers, and FC 200 areas that may be used to complete the delivery and balancing algorithm may determine multiple possible routes that satisfy the efficiency preferences 605 and other criteria. It is contemplated that route generator 611 may report or display the plurality of possible routes to a user. Additionally or alternatively, route generator 611 may determine a preferred route or routes. It is contemplated that route generator 611 may consider additional input not shown in FIG. 6A, for example historical delivery data, data relating to weather conditions, or other factors that may affect delivery routes. It is contemplated that route generator 611 may include additional algorithms and that the algorithms may process the input data in any order or at substantially the same time.

As an example, route generator 611 may implement functionality for determining one or more possible routes. In some embodiments, route generator 611 may include a basic route generator 611A, a route optimizer 611B, and a sequence optimizer 611C. Basic route generator 611A may determine a first set of routes for delivering the plurality of packages. The input to the basic route generator may include a mix of resource data and delivery data, as disclosed above. For example, the input may include a number of delivery vehicles available, a capacity of each delivery vehicle, the preferences for each vehicle, the volume of packages intended for each block area, the distances between block areas, or the like. Basic route generator 611A may include a heuristic algorithm for identifying all possible routes for delivering the packages. The heuristic algorithm may be limited such that each input may be used only once in the determination and may determine the minimum number of routes required to deliver the packages. The routes may be determined at random or determined according to a plurality of predetermined settings. For example, if the input corresponds to that of FIG. 6A, basic route generator 611A may determine two delivery routes, one corresponding with each delivery vehicle, and may randomly assign each block area and each delivery driver to one of the two routes.

Route optimizer 611B may receive the routes determined by the basic route generator and perform a series of transformations. The transformations may be configured to determine the optimal combination of the inputs for each route. For example, continuing the example above, route optimizer 611B may swap one or more of the block areas from the first delivery route to the second delivery route and vice versa. By rearranging the block areas, workers, and other factors, the route optimizer may generate a plurality of possible combinations for the first route and a plurality of possible combinations for the second route. Route optimizer 611B may compare each of the possible first routes with each of the possible second routes and select a first route and second route based on the comparison. For example, route optimizer 611B may select the first route that has a minimized difference with the second route in one or more factors. The comparison may be performed using, for example, a I/O programming model. For example, the factor may be the volume of packages and the route optimizer may choose the first and second route based on the first and second route having the smallest difference between the volume of packages for each route. In other words, the selected first route has approximately the same volume of packages as the selected second route and no other selection of first or second routes would have a smaller difference between the volume in the first route and the second route. The output of route optimizer 611B may include a list of the combination for each route, for example, an indicator of the delivery vehicle to be used, the block areas to serviced, the packages to be delivered, and so forth.

Sequence optimizer 611C may use the output from the route optimizer to determine a sequence for each route. The sequence may include an order in which to service each of the block areas. Sequence optimizer 611C may, for example, represent each block area as a node, determine the distance between each node and the nodes adjacent thereto, and determine the shortest distance for traveling to each node. Determining the shortest distance for traveling to each node (i.e., block area) may be accomplished in substantially the same manner as solving the traveling salesman problem (TSP). For example, sequence optimizer 611C may determine a baseline distance by connecting each node to the two closest adjacent nodes and calculate a total distance required by this model. The sequence optimizer may then swap one or more nodes. If the swap results in a shorter total distance traveled, the sequence optimizer may save that result, it the swap results in a longer total distance traveled, the sequence optimizer may perform a different swap and repeat this process. The swaps may be randomized; alternatively, sequence optimizer 611C may use a heuristic or neural network model to estimate which nodes to swap. After several iterations of the swapping process, the shortest possible route for traveling to each block area is determined.

It is contemplated that sequence optimizer 611C may include additional constraints such that the shortest route is not necessarily the optimal sequence. For example, a constraint may be that the route should never cross over itself and the sequence optimizer will use that information to avoid performing swaps that cause the route to cross itself. The output of the sequence optimizer may be a list of each delivery route and the block areas, workers, delivery vehicles, and so forth associated with each route and a sequence in which to service each block area.

In this example, each of basic route generator 611A, route optimizer 611B, and sequence optimizer 611C may be included in either the matching algorithm or the balancing algorithm discussed above, may be complementary thereto, or may be used instead of the balancing and/or matching algorithms. For example, basic route generator 611A may be included in the matching algorithm and route optimizer 611B and sequence optimizer 611C may be included in the balancing algorithm. In another example, route generator 611 may include only the matching algorithm and the sequence optimizer 611C. The use of basic route generator 611A in combination with route optimizer 611B and sequence optimizer 611C provides efficiency advantages in generated routes which may otherwise be generated in a random or brute-force manner.

Figure 6B:
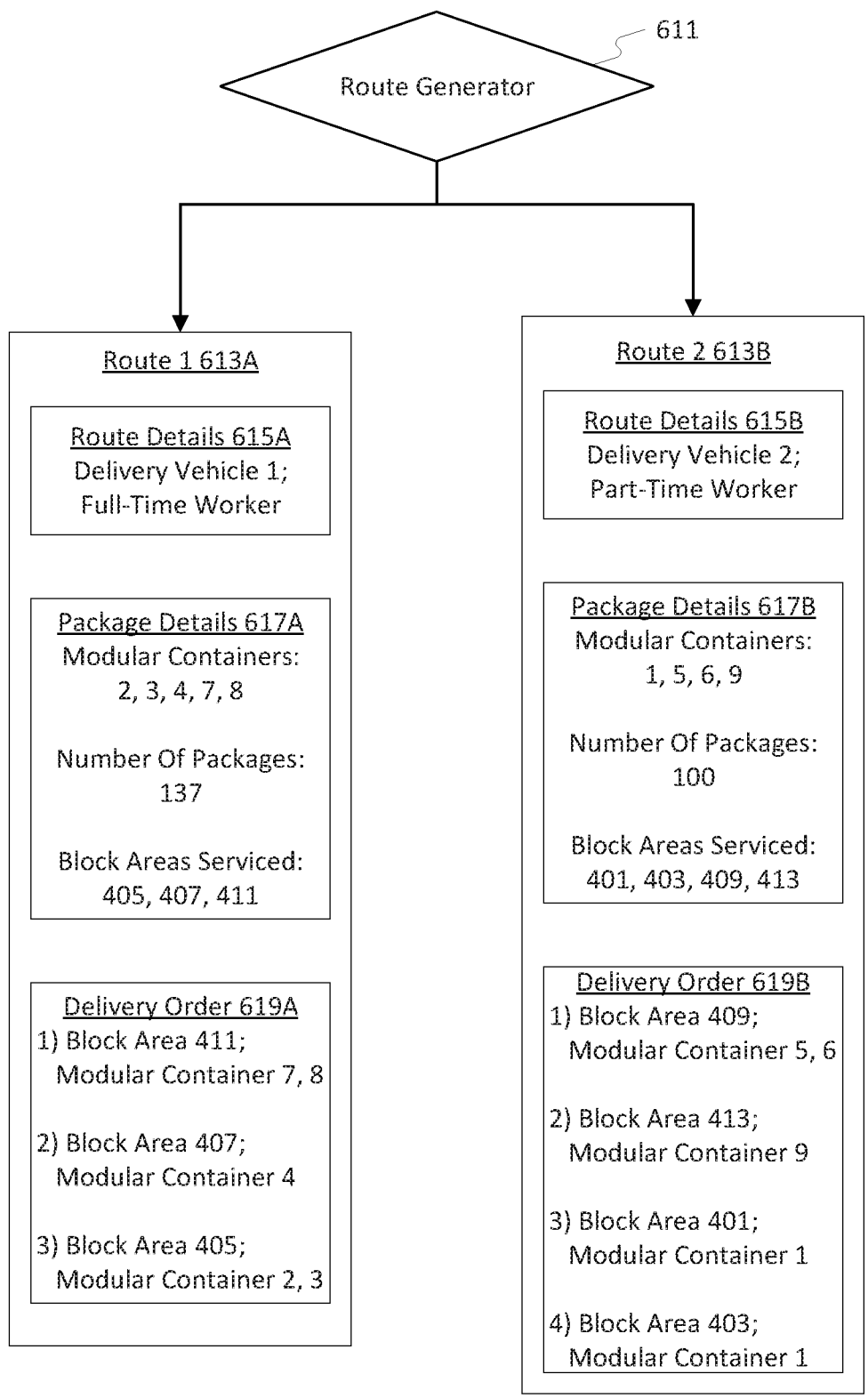
FIG. 6B is a flowchart illustrating output data determined by a route generator consistent with the disclosed embodiments.

FIG. 6B provides an illustration of the type of data that may be output from route generator 611. The output of route generator 611 depicted in FIG. 6B corresponds with the input data depicted in FIG. 6A. In this example, route generator 611 determined two routes, Route 1 613A and Route 2 613B. For each route, route generator 611 generated data identifying which delivery vehicle to use, which worker will deliver the packages, which modular containers will be included in each delivery vehicle, the number of packages to be delivered on each route, the block areas serviced by each route, the order in which the block areas are to be serviced, and so forth. As an example, Route 1 613A includes route details 615A, which identify the delivery vehicle to be used and the worker assigned to the task of delivering packages on that route. Notice that the route details 615A correspond with resource data 603. It is contemplated that route details 615A may include data identifying other logistical information, such as which camp zone 215 is to be used to load the delivery vehicle. The data generated for Route 1 613A may include package details 617A, which identifies the number of packages to be delivered on the route, the identify of the modular containers holding the packages, and the block areas to which the packages correspond. It is contemplated that package details 617A may include any other information relating to the packages, such as the delivery address corresponding with each package, the dimensions of each package, the weight of each package, and so forth. Notice that the entirety of delivery data 601 provided to route generator 611 is accounted for between Route 1 613A in package details 617A and Route 2 613B in package details 6178. The data generated for each route may include an order in which packages are to be delivered or in which block areas are to be serviced. For example, Route 1 613A includes delivery order 619A, which dictates an order in which each block area serviced by Route 1 613A is to be serviced and the modular container or containers that correspond with each block area. As discussed above, the order in which the block areas are to be serviced may be determined by a number of factors, including efficiency preferences 605 and geographic data 607. It is contemplated that delivery order 619A may include additional data, such as navigational directions to and between each block area.

It is contemplated that route generator 611 may be configured to recognize exceptions to the efficiency preferences 605, or otherwise generate specialized routes. For example, if a delivery contains packages that are to be delivered within a specific time frame, which may be reflected in delivery data 601, route generator 611 may give those packages priority, thereby altering their position in the delivery route to ensure they are delivered within the time frame.

The data produced by route generator 611 may be further processed, stored, or transmitted to any system in system 100 or to an external system. For example, the route details 615A may be transmitted to WMS 119 such that a worker or robotic system may prepare the delivery vehicle identified in route details 615A for delivery and assign a task or tasks associated with the delivery to workers or systems in FC 200. Similarly, package details 617A and 617B may be transmitted to a device, such as device 107A, so that a worker or system at hub zone 213 may transport the modular containers identified in package details 617A to a first camp zone 215 and transport the modular containers identified in package details 617B to a second camp zone 215. Similarly, delivery order 619A and delivery order 619B may be transmitted to FO system 113 and be used to determine a PDD or to shipment and order tracking system 111 and be used to aid in tracking the shipment of the packages.

Figure 7A:
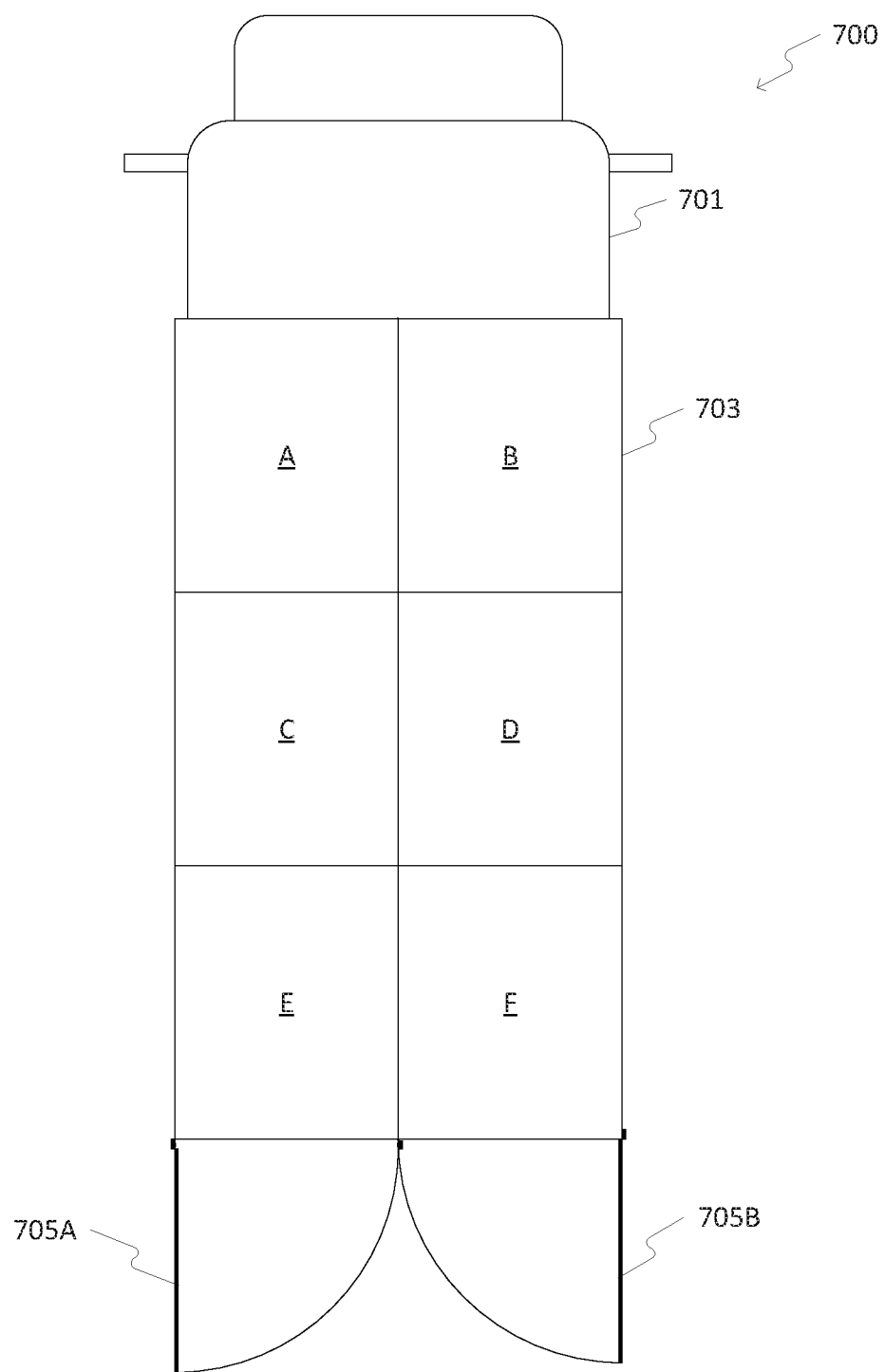
FIG. 7A depicts an exemplary rear-loading delivery vehicle having a plurality of positions within the cargo area thereof, consistent with the disclosed embodiments.
Figure 7B:
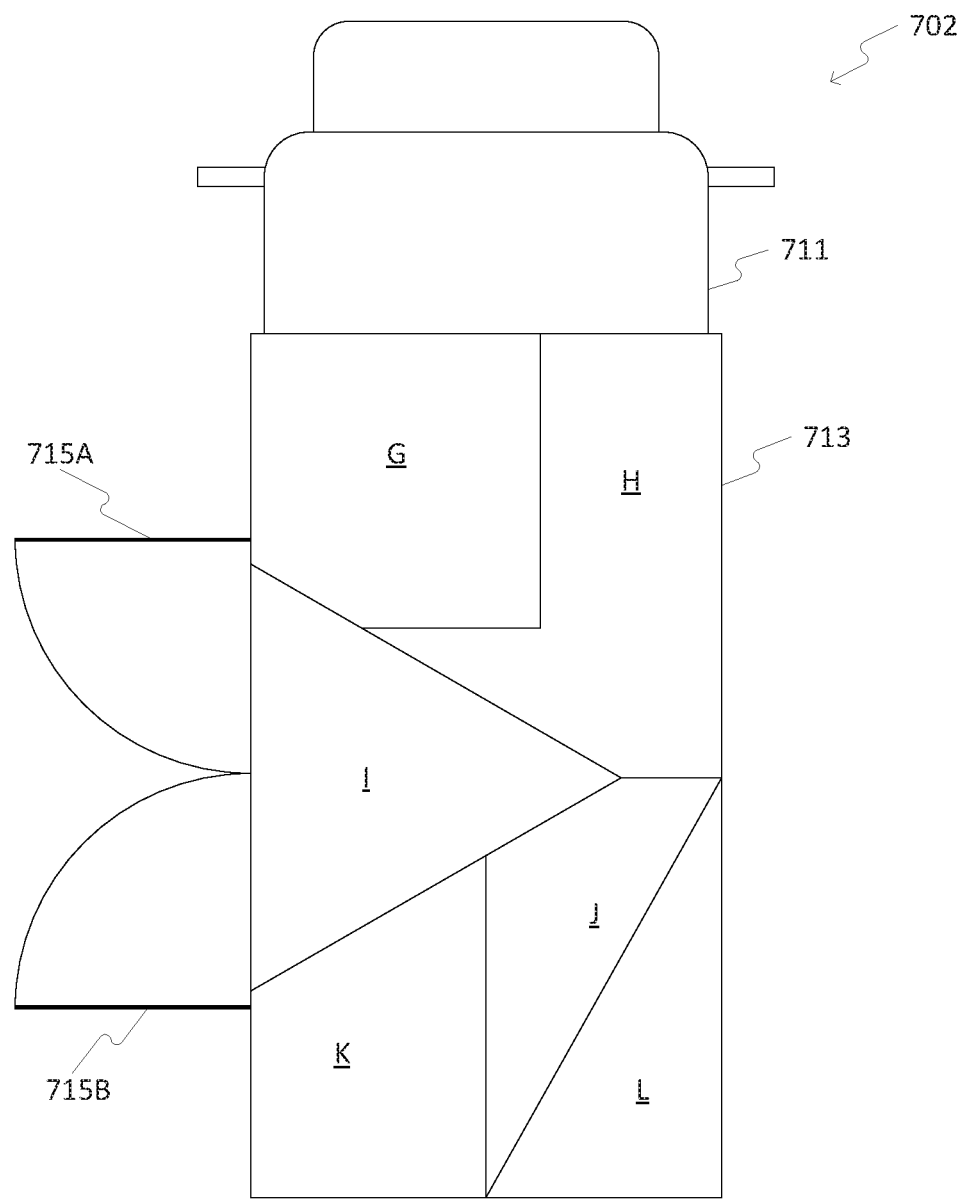
FIG. 7B depicts an exemplary side-loading delivery vehicle having a plurality of positions within the cargo area thereof, consistent with the disclosed embodiments.

FIG. 7A provides a top view illustration of an exemplary delivery vehicle 700. Delivery vehicle is comprised of passenger area 701 and cargo area 703, cargo area 703 having two doors 705A, 705B. Within cargo area 703, there are a plurality of positions A, B, C, D, E, F, at which a group of packages or a modular container may be loaded. It is contemplated that positions A, B, C, D, E, F do not represent physically separated areas within cargo area 703. As may be appreciated from FIG. 7A, areas A and B are nearest the front of delivery vehicle 700 and are the areas within cargo area 703 furthest from doors 705A, 705B. In this example, a preferred loading order may be one in which areas A and B are filled before areas C and D, which are filed before areas E and F. It may also be the case that an area that is equidistant from doors 705A, 705B may be given preference over an adjacent area. For example, it may be the case that door 705A may be opened independently of door 705B, where as door 705B may only be opened if door 705A is already open. In this instance, position F may be given priority over position E such that position F is loaded before position E. In this situation, position E would be associated with the packages to be delivered first and the packages would be loaded into position E last. At the first stop on a delivery route, a worker may deliver the packages of position E, leaving position E vacant for the remainder of the deliveries. Thereafter, the delivery worker may deliver the packages loaded into position F, for example, by removing through vacant space in position E, thereby avoiding the need to open door 705B. There may be additional reasons to prefer one position (e.g., one among positions A, B, C, D, E, F) over another and the examples above are not limiting. FIG. 7B provides another example of a deliver vehicle, delivery vehicle 702. Delivery vehicle 702 is substantially the same as delivery vehicle 700 except that doors 715A and 715B are located on the side of cargo area 713. Similar to above, the preferred loading order may be one the loads the areas furthest from the doors first and loads those nearest the doors last.

In the examples illustrated in FIGS. 7A and 7B, it should be understood that the configuration of delivery vehicles 700 and 702 are exemplary only. In particular, doors 705A, 705B, 715A, 715B may be located anywhere on their respective cargo areas 703, 713 and, while they are illustrated as opening on a hinge, they may open by any means known in the art, such as by sliding, rolling, retracting, and so forth. There may also be a plurality of doors at a plurality of positions, for example a delivery vehicle may have doors located at both the side and rear of the cargo area. The cargo areas 703, 713 may be subdivided into any number of areas and those areas may be of the same or varying sizes and locations. Delivery vehicles 700, 702 may be truck 222, car 224, or any other vehicle capable of being used to accomplish a delivery.

A loading order may include a loading position. The position may be predetermined by a loading guideline or determined on an ad hoc basis. For example, a loading guideline may dictate that all delivery vehicles are to be loaded from left to right and from front to back. In this example, a direction to load a group of packages first is a direction to load the group of packages in the left-most and front-most position within the delivery vehicle. As another example, a loading order may include directions to load a group of packages first and load it in a first position. The position may be determined based on a plurality of factors, such as the dimensions of the delivery vehicle, the dimensions of the group of packages, the block area to which the group of packages belongs, and so forth. The position may be, for example, one of positions G, H, I, J, K, L as depicted in FIG. 7B or a sub-set thereof. For example, a system may determine that a first group of packages should be loaded into position H and determine that a second group of packages should likewise be loaded into position H. The position of the first group may be the right half of position H, the bottom half of position H, or any other division of position H. As may be appreciated from FIG. 7B, positions G, H, I, J, K, L may be of varying shapes and sizes. Determining a position at which to load a group of packages is advantageous because information relating to the position of each package may be provided to a delivery worker or robotic system as packages are being delivered, thereby further reducing the time and effort needed to locate packages within a delivery vehicle. As may be appreciated from this disclosure, the position may correspond with the delivery vehicle.

A loading order may correspond with previously determined delivery routes, block areas, or a combination thereof. For example, the loading order determined at step 309 of method 300 may correspond with the delivery route determined at step 307. For example, data relating to delivery order 619B, as generated by route generator 611, may be used to determine an order. The loading order may be determined such that the packages to be delivered to the first block area are loaded into the delivery vehicle last. The positions within the delivery vehicle may correspond to the determined block areas. For example, as shown in FIG. 6B, Route 2 613B will deliver packages to block area 411 first, then delivery packages to block area 407, then deliver packages to block area 405 last. The loading order for the packages in this example may be a direction to load the packages of route 405 into a delivery vehicle fist, then load the packages of block area 407, and finally load the packages of block area 411 last. For example, if delivery vehicle 702 is used to perform the delivery route, the packages associated with block are 405 may be loaded into position H, the position furthest from the doors and nearest the front of delivery vehicle 702. The packages associated with block area 407 may then be loaded into position G, the position that is one position nearer to the door than the previously loaded position (i.e., position H) and so forth. The advantage of loading the packages in this order is that the packages to be delivered first are positioned nearest the door or access point of the delivery vehicle when the delivery vehicle goes out for delivery. Further, as the delivery vehicle proceeds down the delivery route and packages are removed from the delivery vehicle, the packages to be delivered to each subsequent delivery area will be nearest the door or access point. As such, packages may be delivered more efficiently by reducing the need to locate packages within a delivery vehicle at each delivery area.

The loading order may comprise an order in which to load the plurality of modular containers into a delivery vehicle. It is contemplated that, for example, each of positions A, B, C, D, E, F may be of a size corresponding with that of modular container 501, such that each position A, B, C, D, E, F may receive one modular container. Additionally or alternatively, each of positions A, B, C, D, E, F may be of varying sizes and each may be sized to receive a portion of a modular container, a plurality of modular containers, or the like. For the purposes of the present embodiments, each of positions A, B, C, D, E, F are sized to receive a single modular container, but one of skill will recognize that other sizes and configurations are possible.

For example, the delivery order 619A for Route 1 613A includes three stops on the route (i.e., stops at block areas 411, 407, 405) and five modular containers to be delivered on the route (i.e., modular containers 2, 3, 4, 7, 8). As discussed above, the preferred order may be one in which the packages to be delivered first are loaded last and the packages to be delivered last are loaded first. In this example, the loading order may include loading modular containers 2, 3 first because modular containers 2, 3 correspond with block area 405, which is the last block area to be serviced by Route 1 613A. If delivery vehicle 700 is being used for Route 1 613A, modular containers 2, 3 may be loaded into positions A, B, the positions furthest from doors 705A, 705B. Because modular containers 2, 3 are associated with the same block area 405, it may not matter whether modular container 2 is loaded into position A or position B because both modular containers 2, 3 will be delivered simultaneously. Modular container 4 may be loaded next because it corresponds with block area 407, the second to last block area to be serviced on Route 1 613A. Positions C and D are the vacant positions furthest from the door. As discussed above, there may be a reason to preference either position C or position D over the other. For this example, modular container 4 may be loaded into position D. Finally, modular containers 7, 8, which correspond to the first block area to be serviced on Route 1 613A, may be loaded into delivery vehicle 700. In this example, modular containers 7, 8 may be loaded into position C and position F. As may be appreciated by this disclosure, the use of modular containers provides the advantage of requiring a determination of a loading order and position for relatively few modular containers rather than for each of a plurality of packages or a plurality of groups of packages.

The loading order may be determined by a loading optimization algorithm. The loading optimization algorithm may determine the loading order as described above. The loading optimization algorithm may additionally determine how to divide a cargo area in a delivery vehicle, including the number of positions within the cargo area, the size of each position, the orientation of each position, the mapping of packages or block areas onto each position, a combination thereof, and so forth. For example, loading optimization algorithm may determine that cargo area 703 of delivery vehicle 700 is optimally divided into six equally sized and shaped positions A, B, C, D, E, and F.

While the examples above discuss determining a loading order by determining an order in which to load each of a group of packages or a plurality of modular containers, it is understood that determining a loading order may comprise determining an order in which to load each package of the plurality of packages into a delivery vehicle. For example, determining a loading order may include determining an order in which each package corresponding with a first block area should be loaded into the position within a delivery vehicle associated with that block area. The determination may be performed in substantially the same manner as discussed above.

The loading order or data relating thereto may be transmitted to other systems in the network or external systems, stored, further processed by the same or a different system, displayed on a device, or a combination thereof. For example, the delivery order may be displayed on a device, such as mobile device 107A or mobile device 119A such that a worker may load a delivery vehicle according to the loading order. As another example, the loading order data may be transmitted to WMS 119, FO system 113, SAT system 101, shipment and order tracking system 111, and so forth for further processing. As another example, the data relating to the loading order may be transmitted to a robotic system configured to load a delivery vehicle according to the loading order.

Consistent with this disclosure, the loading order data may be further processed to generate instructions for a device to display a visual representation of the loading order. A visual representation of a loading order may include any visual that may enable a worker or a robotic system to load a delivery vehicle according to the loading order. For example, the visual representation may include a textual description of the loading order, textual directions for loading a delivery vehicle according to the loading order, a graph or table identifying how the delivery vehicle is to be loaded, a visualized loading map, a combination thereof, and so forth. A visualized loading map may include a diagram or map of a delivery vehicle and a plurality of positions within the delivery vehicle. For example, a visualized loading map may comprise a top-view of a delivery vehicle and may include a location of each position determined in association with the loading order. For example, the visualized loading map may appear substantially similar to the illustration of delivery vehicle 700 in FIG. 7A. The visualized loading map may additionally include a diagram showing a package, group of packages, a plurality of package identifiers, a modular container, or a combination thereof in the diagram of the delivery vehicle. It is also contemplated that the visualized loading map may be three-dimensional. That is, rather than being limited to the top view depicted in FIG. 7A, the visualized loading map may display cargo area 703, the positions with cargo area 703, and the packages to be loaded therein, from a plurality of different orientations. Visualized loading map may include a position for each of the plurality of packages, groups of packages, or modular containers to be loaded into a delivery vehicle.

FIG. 8A is an illustration of an exemplary print-out containing a visual representation of a loading order, the visual representation comprising both a table 801 indicating the position at which a plurality of modular containers are to be loaded in a delivery vehicle and textual directions 803 for loading the delivery vehicle. For clarity, the data included in table 801 and textual directions 803 corresponds with prior examples, such as the positions A-L depicted in FIG. 7A and FIG. 7B, with modular containers 1-9 as included in delivery data 601 in FIG. 6A, and with delivery orders 619A, 619B as depicted in FIG. 6B. As discussed above and as displayed in table 801, for delivery order 619A, modular container 2 is to be loaded into position A, modular container 3 is to be loaded into position B, modular container 7 is to be loaded into position C, modular container 4 is to be loaded into position D, nothing is to be loaded into position E, and modular container 8 is to be loaded into position F. Table 801 reports this information and textual directions 803 describes a series of steps for loading the modular containers into the delivery vehicle according to the determined loading order. While FIG. 8A depicts both a table and a textual description 803, either table 801 or textual description 803 may alone be sufficient for conveying the loading order to a robotic system or a worker. While FIG. 8A depicts the visual representation on a print-out 800, it is understood that the visual representation may be displayed on a device, in a virtual space, or on any other modality.

Figure 8B:
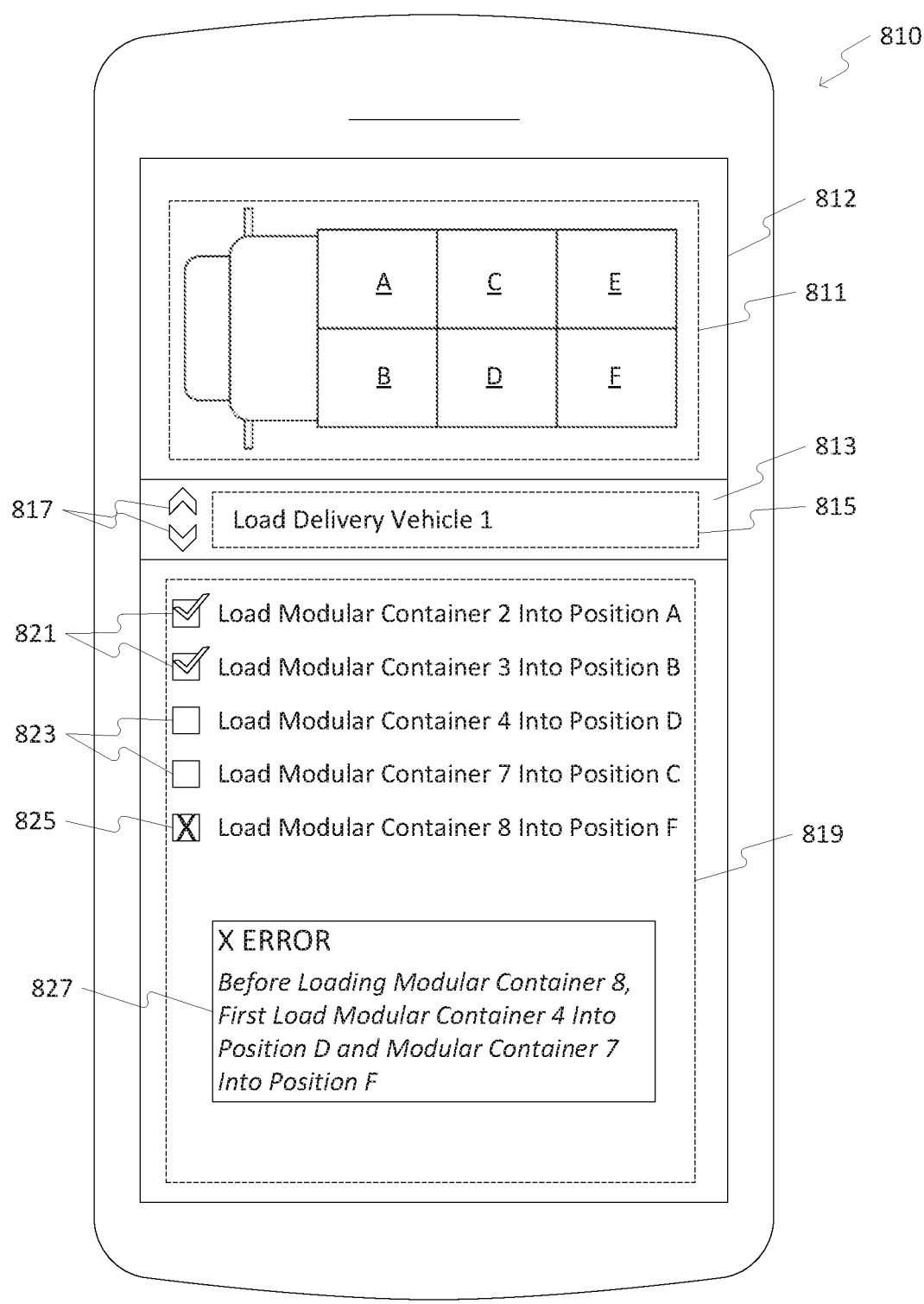
FIG. 8B depicts an exemplary display of a visual representation of a determined loading order, the display consisting of a display on a screen of a device, consistent with the disclosed embodiments.

FIG. 8B provides an exemplary display of a visual representation of a loading order. The visual representation is displayed on device 810. Device 810 may be, for example, a computer, a PDA, a mobile device, or other device with a display. For example, device 810 may be any of devices 107A, 107B, 107C, or another device. It is contemplated that device 810 may be configured to receive and transmit data to and from systems in system 100 and other devices. For example, device 810 may receive the instructions generated by transportation system 107 and display the visual representation in response thereto. In another example, device 810 may transmit data to WMS 119, the data including for example, information relating to the visual representation being displayed on device 810, an input on device 810, or the like. The display of device 810 is represented as touchscreen 812, however, the display may be any display known in the art. Touchscreen 812 is depicted as having three primary display areas, graphical display area 811, task bar 813, and task display area 819. It is understood that the configuration of touchscreen 812 is exemplary only and may have any one or more areas configured to display one or more visual representations of a loading order. For example, touchscreen 812 may have a single display area configured to display an interactive three-dimensional visualized loading map.

Task bar 813 may be the primary means for controlling what is displayed in each of display areas 811 and 819. Task bar 813 may contain means for navigating between a plurality of task. For example, task bar 813 may include navigation arrows 817, which are configured to navigate through a list of pending tasks as a user touches the up or down navigation arrow 817. The means for navigating between tasks may include any other means known in the art, such as a drop-down menu, a scroll-bar, a voice-activated navigator, of the like. Task bar 813 may include task selection area 815, which may be configured to display the identity of the selected task. It is understood that task bar 813 may be located anywhere on a display of device 810 or may be omitted altogether. For example, task bar 813 may be omitted altogether and device 810 may be configured to automatically display a task in response to receiving the instructions generated by the system for optimizing the sorting and loading order, as described above. Graphical display area 811 and task display area 819 may be configured to display any visual representation of a loading order. For example, graphical display area 811 may display a schematic of a delivery vehicle, textual direction for loading a delivery vehicle, or any other visual representation disclosed herein. Task display area 819 may include substantially similar information. In some embodiments, task display area 819 may include an interactive display of the task and may be configured to ensure that a worker or a robotic system loads a delivery vehicle according to the determined loading order.

In the example depicted in FIG. 8B, a selected task, "Load Delivery Vehicle 1," is displayed in task selection area 815. As described above with relation to FIG. 8B, the selected task corresponds with the information generated in other examples herein and depicted in FIG. 6B. Graphical display area 811 may display a schematic of delivery vehicle 1, which corresponds with delivery vehicle 700 of FIG. 7A. The schematic includes the plurality of positions within the cargo area of the delivery vehicle. The display in task display area 819 similarly corresponds with the task selection displayed in task selection area 815. The display in task area 819 includes a plurality of steps for loading the delivery vehicle according to the determined loading order. The steps correspond with those discussed above in relation to FIG. 8A and textual directions 803. The steps are accompanied by a plurality of indicators 821, 823, 825, which monitor the performance of the task. Blank indicator 823 may be the default indicator and may signal that a step of the task has not yet been completed. It is contemplated that the indicator for each step may be blank indicator 823 prior to initiation of the task. Blank indicator 823 may be a symbol that indicates a neutral position, such as the empty box depicted in FIG. 8B, or an emoji with a neutral expression, and so forth. Complete indicator 821 may be an indicator that signals that a step of the task has been completed. Complete indicator 821 may be a modified version of blank indicator 823 or may be a symbol different than that of blank indicator 823 which indicates completion of a task. For example, complete indicator 821 may be the check-marked box depicted in FIG. 8B, or an emoji with an elated or accomplished expression, and so forth. It is contemplated that a worker may change a blank indicator 823 into a complete indicator 823 upon the completion of a step of a task by, for example, pressing or selecting the indicator. It is also contemplated that the indicator may be configured to change automatically upon completion of a step. For example, a plurality of sensor or camera systems may be configured to monitor a task and send a signal to device 810 when the task is completed, device 810 may then be configured to change blank indicator 823 into complete indicator 821. Error indicator 825 may be an indicator that signals that a step of the task was completed incorrectly or in the wrong order. Error indicator 825 may be a modified version of blank indicator 823 or may be a symbol different than that of blank indicator 823 which indicates erroneous completion of a task. For example, error indicator 825 may be the "X"-marked box depicted in FIG. 8B, or an emoji with a sad expression, and so forth. It is contemplated that an error indicator 825 may be displayed if a worker touches or selects an indicator in an order that is out of sequence with the determined loading order. For example, if a worker loads modular container 8 into position F before loading modular container 7 into position C, task display area 819 may be configured to display error indicator 825. It is also contemplated that the sensor or camera system may monitor the loading of a delivery vehicle and automatically generate instructions for displaying error indicator 825 when the delivery vehicle is loaded erroneously. It is contemplated that an error message may be displayed in association with error indicator 825. For example, when error indicator 825 is displayed, error message 827 may be displayed at substantially the same time. Error message 827 may include a visual representation of the reason for the error indicator 825, such as a textual description of the error. It is contemplated that while error message 827 is displayed, task display area 819 may be configured to prohibit further action unless or until the error is resolved. The example depicted in FIG. 8B is exemplary only and it is understood that a device may be configured to display a visual representation of a loading order by any means consistent with this disclosure.

Consistent with this disclosure, the system for optimizing the sorting and loading of packages may be configured to generate instructions for displaying information related to the determined delivery route. The instructions may be transmitted to a device and a visual representation of the delivery route may be displayed in substantially the same manner as discussed with relation to FIG. 8B. For example, one of the tasks that may be displayed in task selection area 815 may be "Deliver Packages on Route 1" and the display in graphical display area 811 and task display area 819 may display information relating to the determined delivery route. For example, graphical display area 811 may display a map of the delivery route, which may correspond to geographic area 400 of FIG. 4, and task display area 819 may display textual directions for achieving the delivery, including steps corresponding with delivery order 619A of FIG. 6B.

Consistent with this disclosure, it is contemplated that the system for optimizing the sorting and loading of packages may be configured to perform the methods and processes disclosed herein in response to input from a display of a visual representation of a determined loading order. For example, if a visualized loading map is displayed on a device, as discussed above, and a worker decided that he or she would rather deliver the packages in a different order than that determined by the system, the worker may make a change to the route and the system may receive the input relating to the change. The system may then repeat the steps of method 300, for example, to determine a new loading order consistent with the altered delivery route and generate instructions for display of a new visualized loading map consistent with the alteration. A similar adjustment may be made at any step of method 300. For example, a worker may alter a block area determined at step 303, for example by changing the size, dimension, etc. of a block area or combining a first block area with a second block area, and the system may then perform the remaining steps of method 300 to determine a loading order consistent with the alteration, and so forth.

Consistent with this disclosure, the visual representation of the loading order may be used during the delivery of the plurality of packages. For example, instructions for displaying a visualized loading map may be delivered to a device such that a delivery worker may view the visualized loading map. The worker may view the visualized loading map on a display of the device to see the position of a package or group of packages to be delivered and easily locate the package without having to manually sort through or scan the packages in the delivery vehicle. For example, a delivery worker may be prompted to delivery packages on a route determined by, for example, transportation system 107. While executing the delivery, the worker may have a device, such as device 810, which includes a display of the steps of the delivery, for example in task display area 819. As the worker approaches a first delivery area, such as a first block area, the device may display the location of the packages to be delivered to that delivery area, for example, in a visualized loading map on graphical display 811. The worker may use this information to quickly and easily locate the packages to be delivered to the area. The worker may provide input to device 810 indicating that the packages have been located or delivered, for example, by scanning a barcode affixed to the packages as they are located and/or as they are delivered. Device 810 may then update to display the next delivery, and so forth. This provides a distinct advantage over the state of the art.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/ AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for optimizing sorting and loading of packages, the system comprising:
    a non-transitory computer-readable medium configured to store instructions; and
    at least one processor configured to execute the instructions to perform operations comprising:
        receiving data comprising a plurality of package identifiers associated with a plurality of packages;
        receiving configuration parameters of a delivery vehicle, the configuration parameters comprising one or more available positions;
        causing a sorting device or a robotic sorter to sort the plurality of packages into one or more compartments within a plurality of modular containers;
        determining a loading order in which to load the plurality of modular containers into the available positions based on the configuration parameters of the delivery vehicle; and
        generating instructions for a device to display a visual representation of the determined loading order.

2. The computer-implemented system of claim 1, wherein the configuration parameters include one or more spaces within the one or more available positions, and wherein determining the loading order comprises determining one or more sub-loading orders in which to load the plurality of modular containers into the one or more spaces.

3. The computer-implemented system of claim 1, wherein causing the sorting device or the robotic sorter to sort the plurality of packages comprises:
    determining dimensions of the delivery vehicle based on the configuration parameters; and
    selecting the plurality of modular containers based on the dimensions of the delivery vehicle.

4. The computer-implemented system of claim 1, wherein dimensions of the plurality of modular containers are divisors of dimensions of the delivery vehicle.

5. The computer-implemented system of claim 1, wherein determining the loading order is based on a predetermined loading guideline.

6. The computer-implemented system of claim 1, wherein determining the loading order comprises prioritizing positions in the delivery vehicle that are farther from one or more access points of the delivery vehicle over positions in the delivery vehicle that are closer to the access points.

7. The computer-implemented system of claim 1, wherein the configuration parameters further comprise a door opening sequence in which one or more doors of the delivery vehicle are opened and wherein determining the loading order comprises prioritizing positions in the delivery vehicle that are closer to the later opening doors over positions in the delivery vehicle that are closer to the earlier opening doors.

8. The computer-implemented system of claim 1, further comprising:
    determining a delivery route comprising a delivery sequence for delivering the plurality of packages.

9. The computer-implemented system of claim 8, wherein determining the loading order comprises assigning packages that are earlier in the delivery sequence to the available positions that are closer to one or more access points of the delivery vehicle.

10. The computer-implemented system of claim 8, wherein determining the loading order comprises assigning packages that are later in the delivery sequence to the available positions that are farther from one or more access points of the delivery vehicle.

11. A computer-implemented method for optimizing sorting and loading of packages, the method comprising:
    receiving data comprising a plurality of package identifiers associated with a plurality of packages;
    receiving configuration parameters of a delivery vehicle, the configuration parameters comprising one or more available positions;
    causing a sorting device or a robotic sorter to sort the plurality of packages into one or more compartments within a plurality of modular containers;
    determining a loading order in which to load the plurality of modular containers into the available positions based on the configuration parameters of the delivery vehicle; and
    generating instructions for a device to display a visual representation of the determined loading order.

12. The computer-implemented method of claim 11, wherein the configuration parameters include one or more spaces within one or more available positions, and wherein determining the loading order comprises determining one or more sub-loading orders in which to load the plurality of modular containers into the one or more spaces.

13. The computer-implemented method of claim 11, wherein causing the sorting device or the robotic sorter to sort the plurality of packages comprises:
    determining dimensions of the delivery vehicle based on the configuration parameters; and
    selecting the plurality of modular containers based on the dimensions of the delivery vehicle.

14. The computer-implemented method of claim 11, wherein dimensions of the plurality of modular containers are divisors of dimensions of the delivery vehicle.

15. The computer-implemented method of claim 11, wherein determining the loading order is also based on a predetermined loading guideline.

16. The computer-implemented method of claim 11, wherein determining the loading order comprises prioritizing positions in the delivery vehicle that are farther from one or more access points of the delivery vehicle over positions in the delivery vehicle that are closer to the access points.

17. The computer-implemented method of claim 11, wherein the configuration parameters further comprise a door opening sequence in which one or more doors of the delivery vehicle are opened and wherein determining the loading order comprises prioritizing positions in the delivery vehicle that are closer to the later opening doors over positions in the delivery vehicle that are closer to the earlier opening doors.

18. The computer-implemented method of claim 11 further comprising:
    determining a delivery route comprising a delivery sequence for delivering the plurality of packages.

19. The computer-implemented method of claim 18, wherein determining the loading order comprises:
    assigning packages that are earlier in the delivery sequence to the available positions that are closer to one or more access points of the delivery vehicle; and
    assigning packages that are later in the delivery sequence to available positions that are farther from the access points.

20. A computer-implemented system for optimizing sorting and loading of packages, the system comprising:
    a non-transitory computer-readable medium configured to store instructions; and
    at least one processor configured to execute the instructions to perform operations comprising:
        receiving data comprising a plurality of package identifiers associated with a plurality of packages;
        determining a delivery route comprising a delivery sequence for delivering the plurality of packages;
        causing a sorting device or a robotic sorter to sort the plurality of packages into one or more compartments within a plurality of modular containers;
        receiving configuration parameters of a delivery vehicle, the configuration parameters comprising one or more available positions;
        determining a loading order in which to load the plurality of modular containers into the available positions based on the configuration parameters of the delivery vehicle; and
        generating instructions for a device to display a visual representation of the determined loading order.

* * * * *

UNITED STATES PATENT AND TRADEMARK OFFICE
CERTIFICATE OF CORRECTION

PATENT NO. : 10,710,121 B1  
APPLICATION NO. : 16/583616  
DATED : July 14, 2020  
INVENTOR(S) : Wenting Mo et al.

Page 1 of 1

It is certified that error appears in the above-identified patent and that said Letters Patent is hereby corrected as shown below:

In the Claims

Claim 12, Column 34, Line 38, "spaces within one or more available positions" should read
-- spaces within the one or more available positions --.

Signed and Sealed this
Twenty-second Day of September, 2020

Andrei Iancu
*Director of the United States Patent and Trademark Office*